(12) United States Patent
Imatoh

(10) Patent No.: US 10,817,684 B2
(45) Date of Patent: Oct. 27, 2020

(54) SEMICONDUCTOR DEVICE, NON-CONTACT ELECTRONIC DEVICE, AND PERIOD DETECTION METHOD

(71) Applicant: LAPIS Semiconductor Co., Ltd., Yokohama (JP)

(72) Inventor: Yuki Imatoh, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 281 days.

(21) Appl. No.: 15/939,298

(22) Filed: Mar. 29, 2018

(65) Prior Publication Data

US 2018/0285608 A1 Oct. 4, 2018

(30) Foreign Application Priority Data

Mar. 30, 2017 (JP) ................................ 2017-068626

(51) Int. Cl.
*G06K 7/10* (2006.01)
*G06K 19/07* (2006.01)

(52) U.S. Cl.
CPC ..... *G06K 7/10386* (2013.01); *G06K 19/0723* (2013.01)

(58) Field of Classification Search
CPC .......... G06K 7/10386; G06K 19/0723; G06K 19/07773; G06K 19/07749
See application file for complete search history.

(56) References Cited

U.S. PATENT DOCUMENTS 7,612,598 B2 * 11/2009 Endo .......................... G06F 1/04
327/291
2006/0163370 A1 * 7/2006 Diorio .................. G06K 7/0008
235/492

FOREIGN PATENT DOCUMENTS

JP 2008287387 11/2008

* cited by examiner

*Primary Examiner* — Sonji N Johnson
(74) *Attorney, Agent, or Firm* — JCIPRNET

(57) ABSTRACT

A semiconductor device, a non-contact electronic device, and a period detection method are provided. The semiconductor device includes an edge detection unit that detects edges of one of rises and falls of a data signal received via radio waves, a counting unit that counts a number of N-divided clock signals having a frequency which is 1/N (N is an integer equal to or greater than 2) of a frequency of a reference clock signal having a predetermined frequency according to the data signal in a section of the adjacent edges, a fraction counting unit that counts fractions of the N-divided clock signals determined according to a phase difference between the edge and the N-divided clock signal, and a first addition unit that adds a value obtained by multiplying the counted number by N to the fractions, and outputs a resultant value as a period of the data signal.

7 Claims, 6 Drawing Sheets

SEMICONDUCTOR DEVICE, NON-CONTACT ELECTRONIC DEVICE, AND PERIOD DETECTION METHOD

CROSS-REFERENCE TO RELATED APPLICATION

This application claims the priority benefit of Japanese application serial no. 2017-068626, filed on Mar. 30, 2017. The entirety of the above-mentioned patent application is hereby incorporated by reference herein and made a part of this specification.

BACKGROUND

Technical Field

The disclosure relates to a semiconductor device, a non-contact electronic device, and a period detection method, and particularly to a semiconductor device, a non-contact electronic device (a radio frequency identification (RFID) tag), and a period detection method relating to period detection in a pulse interval encoding (PIE) decoding unit of a RFID tag.

Description of Related Art

An RFID tag (RFID chip) is used, for example, to wirelessly identify and manage a person or an object. Usually, a unique number is allocated to the RFID tag, and the unique number can be read from a device called a reader-writer through wireless communication. Since the reader-writer side associates the unique number of the RFID tag with an actual object, the RFID tag itself usually does not have a complicated function.

There are several types of RFID tags as described above, but attention to a 900 MHz band has recently increased due to a long communication distance and the like. Various specifications regarding a 900 MHz band RFID tag are defined as standards. For example, a standard called "EPC Global Class 1 Generation 2 (abbreviated as EPCC1G2 or EPCGen2)" is widely known. Meanwhile, although an RFID tag has a relatively simple function as described above, the RFID tag should be very inexpensive, for example, because the RFID tag is used as a substitute for a barcode. Further, since an RFID tag is usually configured as a passive type that operates with power received from radio waves emitted by a reader-writer, low current consumption is required.

As an example of an RFID tag aimed at reducing current consumption, a non-contact electronic device disclosed in Japanese Patent Application Laid-open No. 2008-287387 (Patent Document 1) is known. In the non-contact electronic device disclosed in Patent Document 1, a circuit capable of setting an oscillation frequency of a reference clock CLK in proportion to a value of a frequency setting signal TR_OSC1 is provided, and when a signal (TRcal) defining a communication speed transmitted from a reader-writer is received, one period of the TRcal is counted with the reference clock CLK of which a TR_OSC1 value is X, for example, and a TRcal counter value is obtained as a count result. The TR_OSC1 value in a case in which the TRcal counter value is desired to be set to a predetermined set value Y is converted using this TRcal counter value and X, and a reply is performed toward the reader-writer using a CLK reflecting the converted value.

In Patent Document 1, since a scheme of causing the oscillation frequency of the CLK to be variable according to the communication speed as described above has been used, accuracy of the communication speed is determined by accuracy of frequency setting of the CLK, and a CLK at a frequency lower than that in the related art can be used.

Incidentally, in a passive type RFID tag, current consumption is inversely proportional to a communication distance. Accordingly, when the current consumption is lower, characteristics such as the communication distance are likely to be excellent. On the other hand, since a unit requiring a highest operating frequency at the time of a reception operation of the passive type RFID tag is a PIE decoding unit, a unit in which current consumption becomes highest within a logic circuit of the RFID tag is generally the PIE decoding unit. That is, reducing the current consumption of the PIE decoding unit is considered to greatly contribute to improvement of characteristics of the passive type RFID tag.

Among circuits constituting the PIE decoding unit, a period detection circuit that detects a period of a data signal input via an antenna generally directly uses a clock at a highest frequency, and reducing a consumption current of the period detection circuit is considered to be an effective means for improving the characteristics of passive type RFID tags.

FIG. 6(a) illustrates a period detection circuit 80 according to the related art. As illustrated in FIG. 6(a), the period detection circuit 80 includes an edge detection unit 82 and a counter 84. As illustrated in FIGS. 6(a) and 6(b), a Data (data) signal and a Clock (clock) signal are input to the edge detection unit 82, a rising edge of the input Data signal is detected, and an Enable signal (a rising edge detection signal) is generated in each detection, as illustrated in FIG. 6(b).

The counter 84 is a period measurement circuit which counts a period of the Data signal using a number of the Clock signals, and is initialized by an Enable signal. The number of the Clock signals up to a next Enable signal is counted. In FIG. 6(b), an Enable signal (pulse) is generated by detecting a rising edge of the Data signal at time t1, and output (Counter out) from the counter 84 is started at time t2 of a falling edge of the Enable pulse. That is, a counting operation is started. When the Data signal rises again at time t3, the Enable pulse is output, and the count is reset at time t4 of the falling edge of the Enable pulse. In FIG. 6(b), since N clock signals are counted during one period of the Data signal, the period of the Data signal can be obtained as N×Tc (seconds) when the period of the Clock signal is Tc (seconds).

However, although the period detection circuit 80 has a simple configuration in terms of a circuit, there is a certain limit from the viewpoint of reduction of current consumption since the period is measured using the Clock signal at a high frequency. That is, a significant reduction in current consumption cannot be expected as long as the period detection circuit 80 according to the related art as illustrated in FIG. 6(a) is used.

In this respect, the non-contact electronic device disclosed in Patent Document 1 adjusts a frequency on the basis of a count value of the clock. However, the non-contact electronic device adjusts a frequency of a transmission signal, and does not adjust a frequency in PIE decoding, unlike the period detection circuit 80.

SUMMARY

A semiconductor device according to an embodiment of the invention includes: an edge detection unit that detects edges of one of rises and falls of a data signal received via radio waves; a counting unit that counts a number of N-divided clock signals having a frequency which is 1/N (N is an integer equal to or greater than 2) of a frequency of a reference clock signal having a predetermined frequency according to the data signal in a section of the adjacent edges; a fraction counting unit that counts fractions of the N-divided clock signals determined according to a phase difference between the edge and the N-divided clock signal; and a first addition unit that adds a value obtained by multiplying a count value of the counting unit by N to the fractions, and outputs a resultant value as a period of the data signal.

A non-contact electronic device according to an embodiment of the invention includes the semiconductor device, and an antenna that receives the radio waves including the data signal.

A period detection method according to an embodiment of the invention includes: detecting, by an edge detection unit, edges of one of rises and falls of a data signal received via radio waves; counting, by a counting unit, a number of N-divided clock signals having a frequency which is 1/N (N is an integer equal to or greater than 2) of a frequency of a reference clock signal having a predetermined frequency according to the data signal in a section of the adjacent edges; counting, by a fraction counting unit, fractions of the N-divided clock signals determined according to a phase difference between the edge and the N-divided clock signal; and adding, by a first addition unit, a value obtained by multiplying a count value of the counting unit by N to the fractions to detect a period of the data signal.

DESCRIPTION OF THE EMBODIMENTS

The disclosure has been made to solve the above-described problem, and an aspect of the disclosure is to provide a semiconductor device using a new type of period detection circuit capable of efficiently reducing current consumption, a non-contact electronic device, and a period detection method.

According to one or some exemplary embodiments of the invention, it is possible to provide a semiconductor device using a new type of period detection circuit capable of efficiently reducing current consumption, a non-contact electronic device, and a period detection method.

Hereinafter, modes for carrying out the embodiments of the invention will be described in detail with reference to the drawings.

First Embodiment

Figure 1:
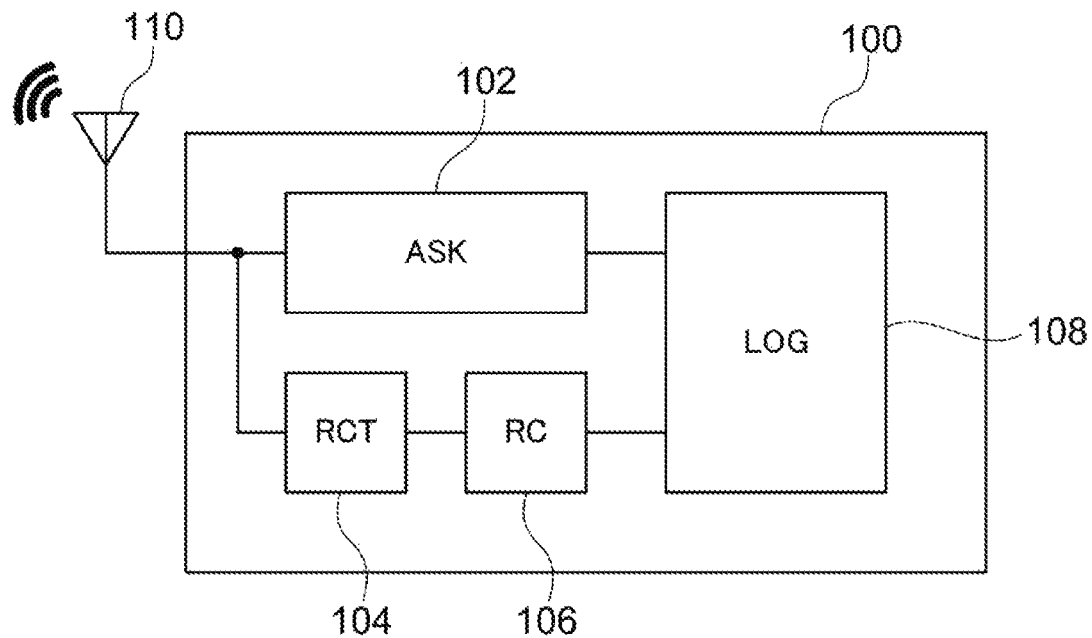
FIG. 1 is a block diagram illustrating an example of a configuration of a tag according to an embodiment.

An example of a configuration of a passive type RFID tag (hereinafter, a "tag") 100 according to this embodiment will be described with reference to FIG. 1. As illustrated in FIG. 1, the tag 100 includes a modulation and demodulation circuit (ASK) 102, a rectification circuit (RCT) 104, a clock circuit (RC) 106, and a logic circuit (LOG) 108. The tag 100 is configured as, for example, a chip of a semiconductor integrated circuit, and an antenna 110 is connected to the outside of the chip.

The antenna 110 receives radio waves from a reader-writer and transmits radio waves to the reader-writer. The modulation and demodulation circuit 102 demodulates data received from the reader-writer via the antenna 110 and modulates data to be transmitted from the tag 100 to the reader-writer. The rectification circuit 104 extracts power from the radio waves received by the antenna 110 and supplies the extracted power to an internal circuit of the tag 100. A clock circuit 106 includes an RC oscillator. When the clock circuit 106 receives the power from the rectification circuit 104, the clock circuit 106 generates a clock at a predetermined frequency and supplies the clock to the logic circuit 108. The clock signal output from the clock circuit 106 is a clock signal (a Clock signal to be described below) used as a reference of a clock signal that is used in the tag 100. The logic circuit 108 performs control of a communication speed in the tag 100, processing of various information, and the like.

Figure 2:
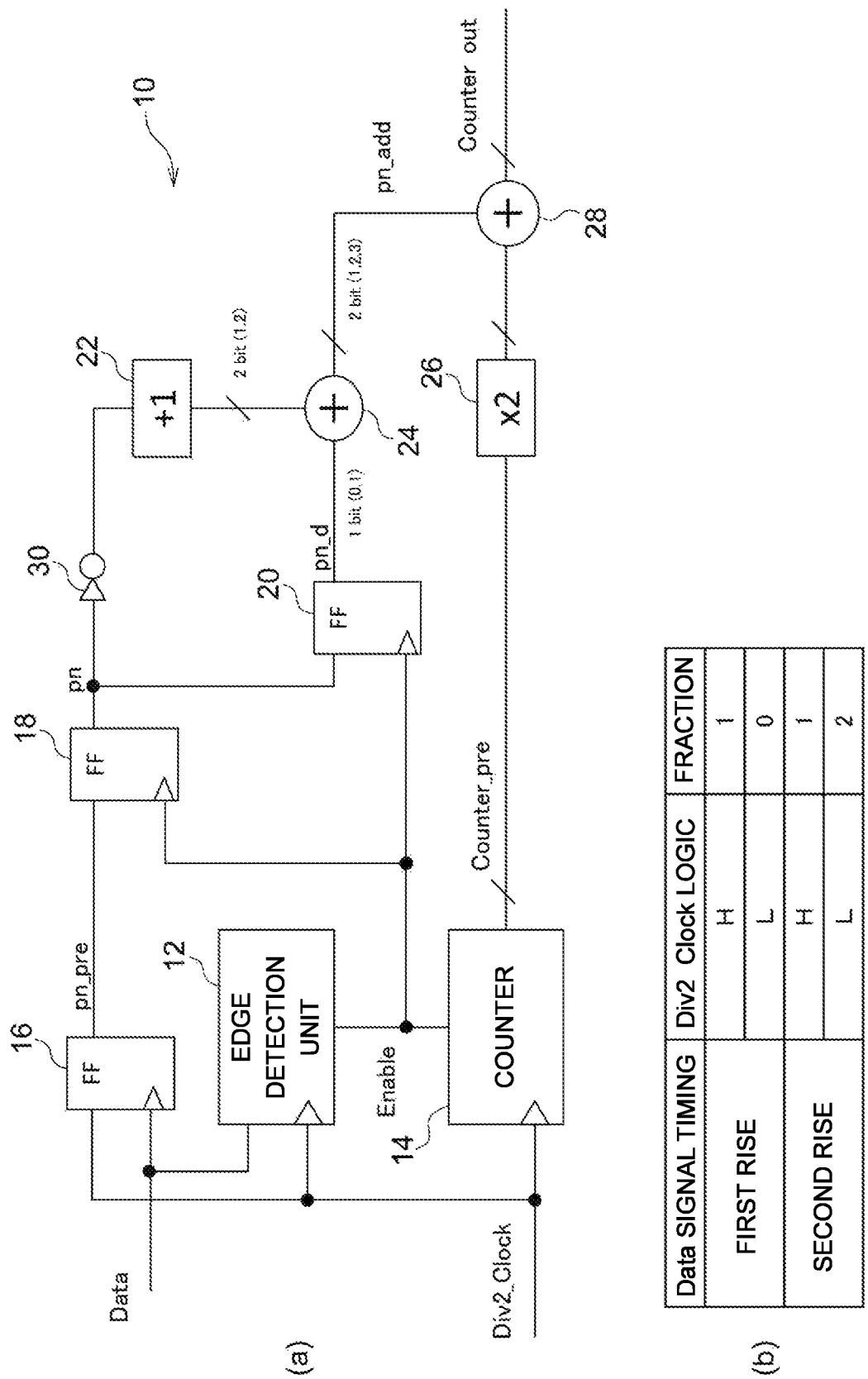
FIG. 2 illustrates (a) a circuit diagram of an example of a configuration of a period detection circuit and (b) a fraction in a case in which a timing of a first rising edge of the Data signal matches H or L of the Div2_Clock signal and a case in which a timing of a second rising edge matches H or L of the Div2_Clock signal according to a first embodiment.

Next, a period detection circuit 10 according to the embodiment will be described with reference to FIGS. 2 and 3. The period detection circuit 10 is included in the modulation and demodulation circuit 102, and detects the period of the data signal (Data) received by the antenna 110. As illustrated in FIG. 2(a), the period detection circuit 10 includes an edge detection unit 12, a counter 14, flip-flops (FF) 16, 18, and 20, a 1-addition unit 22, an addition unit 24, a 2-multiplication unit 26, an addition unit 28, and an inverter 30.

A Data (data) signal and a Div2_Clock (2 frequency-divided clock) signal are input to the edge detection unit 12. The edge detection unit 12 detects a rising edge of the input Data signal, and generates an Enable signal (a rising edge detection signal) with each detection, as illustrated in FIG. 3. In the embodiment, an aspect in which the edge detection unit detects the rising edge will be illustrated and described, but the present invention is not limited thereto, and an aspect in which falling edges are detected may be adopted. The counter 14 is a period measurement circuit which counts the period of the Data signal using the number of the Div2_Clock signal. The counter 14 is initialized by a certain Enable signal, and the number of Div2_Clock signals up to the next Enable signal is counted. Here, as illustrated in FIG. 3, the Div2_Clock signal is a clock signal obtained by dividing the Clock signal which is the reference clock signal into a ½ frequency using a frequency divider (not illustrated). The Enable_O signal and the Expect signal illustrated in FIG. 3 are signals that are not directly related to the circuit in FIG. 2(a), the Enable_O signal indicates an Enable signal when the signal is generated by the Clock signal, and the Expect signal indicates a count value of the Clock signal in one period of the Data signal.

In the period detection circuit 10 according to the embodiment, a frequency of a clock that is used for period detection is reduced to ½ of the reference clock signal (a period is doubled) in order to reduce the current consumption. The number of Div2_Clock signals included within one period of the Data signal indicated by a section of the Enable signal is counted by the counter 14, and an obtained count value is doubled and converted into the number of the Clock signals that are used as the reference clock signal. In this case, since a frequency of the Div2_Clock signal does not match a frequency of the Clock signal, in addition to the number of net Div2_Clock signals, fractions are considered and the fractions are separately calculated and added to the net number.

That is, at a start point of counting of Div2_Clock, the fraction is different according to whether a timing of a rising edge of the Data signal (Enable signal) is a timing of a high level (hereinafter referred to as "H") of the Div2_Clock signal or a timing of a low level (hereinafter referred to as "L") thereof. That is, the fraction is different according to a phase difference between the Data signal and Div2_Clock. This situation is the same at an end point of counting of Div2_Clock. Therefore, in order to convert a count value of the Div2_Clock signal into a count value of the Clock signal, a calculation shown in the following (Equation 1) is performed.

$$N = Nn + F1 + F2 \quad \text{(Equation 1)}$$

Here, N is the count value of the Clock signal, Nn is a net count value of the Div2_Clock signal, F1 is a fraction (a first fraction) at a timing of a certain rising edge (hereinafter a "first rising edge") of the Data signal, and F2 is a fraction (a second fraction) at a timing of a next rising edge (hereinafter, a "second rising edge") of the Data signal.

FIG. 2(b) illustrates a fraction in a case in which a timing of a first rising edge of the Data signal matches H or L of the Div2_Clock signal and a case in which a timing of a second rising edge matches H or L of the Div2_Clock signal. It can be seen from FIG. 2(b) that a sum of the fractions added to the net count value of the Div2_Clock signal may be 1, 2, or 3.

Figure 3:
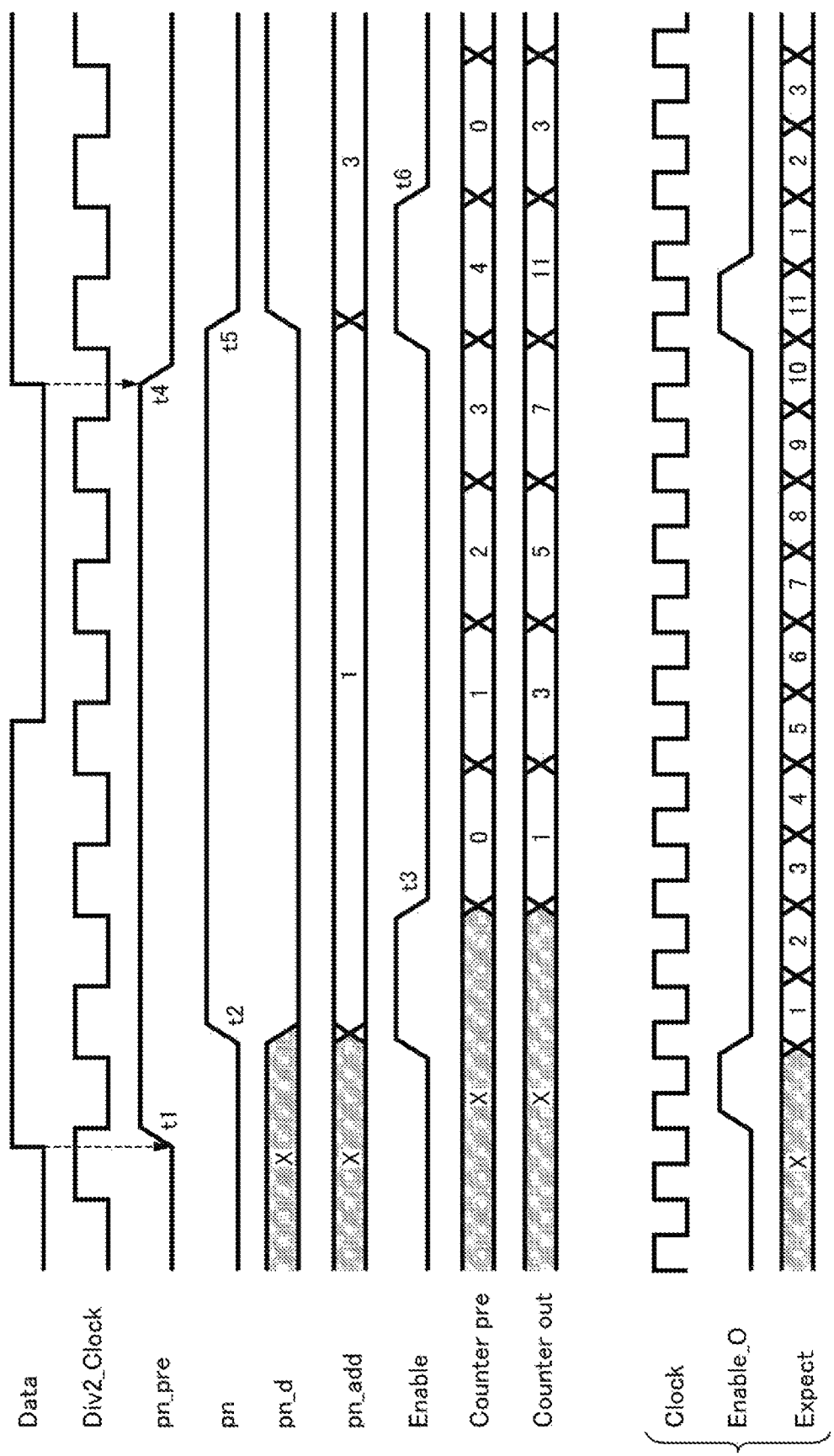
FIG. 3 is a timing chart illustrating an operation of the period detection circuit according to the first embodiment.

As illustrated in FIG. 2(a), the Div2_Clock signal is fetched at the timing of the Data signal by a flip-flop 16 and becomes a pn_pre signal (time t1 in FIG. 3). The pn_pre signal is further identified at the timing of the Enable signal by the flip-flop 18 and becomes a pn signal (time t2 in FIG. 3). The pn signal is further identified at the timing of the Enable signal by the flip-flop 20, and becomes a pn_d signal. The pn_d signal is obtained by shifting a previously input pn signal. That is, a shift register is constituted by the flip-flops 18 and 20.

In this case, the pn_d signal has a value (1 bit) indicating a fraction F1 at a timing of a first rising edge of the Data signal, and the pn signal has a value indicating a fraction F2 at a second rising edge of the Data signal. However, since the pn signal is a 1-bit indication (1 at H of the Div2_Clock signal, and 0 at L), the pn signal is inverted by the inverter 30, and 1 is added to the inverted pn signal by the 1-addition unit 22 to be converted into a 2-bit indication (1 at H of the Div2_Clock signal, and 2 at L; see FIG. 2(b)). A sum (F1+F2) of the fractions is calculated by adding the converted value to the pn_d signal using the addition unit 24, and a pn_add signal indicating a calculation result is generated.

As illustrated in FIG. 3, counting in the counter 14 is started at a timing (time t3) of a falling edge of the Enable signal. At a timing (time t4) of the next rising edge of the Data signal, a logic of the pn signal and the pn_d signal is inverted, an Enable signal is generated (time t5), and counting in the counter 14 ends at a falling edge (time t6) of the Enable signal. At this time, in the example illustrated in FIG. 3, a Counter_pre signal which is an output of the counter 14 counts from 0 to 4. Meanwhile, for example, the pn_add signal becomes F1=1 at a first rising point of the Data signal, and becomes (F1+F2)=3 (that is, F2=2) at a second rising point of the Data signal.

As a result, until time t5, 1 is added to a signal obtained by doubling a Counter pre signal which is a count value of the counter 14 using the 2-multiplication unit 26, and a Counter out signal is shifted to 1, 3, 5, and 7. On the other hand, at time t5, the fraction F2=2 at a timing of the second rising edge of the Data signal is added to become (F1+F2)=3, and therefore, the Counter out signal becomes 11 (4×2+3). This result matches the result 11 of the Expect signal which is the result of counting with the Clock signal, and it can be seen that the period detection circuit 10 according to the embodiment is operating correctly.

As described in detail above, according to the period detection circuit 10 of the embodiment, since the period detection circuit of a new scheme is configured using the Div2_Clock signal which is a clock signal at a ½ frequency of the Clock signal which is the clock signal serving as a reference, the current consumption of the tag can be efficiently reduced. In this case, the accuracy of the counter is not different from that of the period detection circuit 80 according to the related art as described above. According to a comparison through simulation, the period detection circuit 10 has an effect of reducing 30 to 40% of the current consumption in the period detection circuit 80.

Second Embodiment

Figure 4:
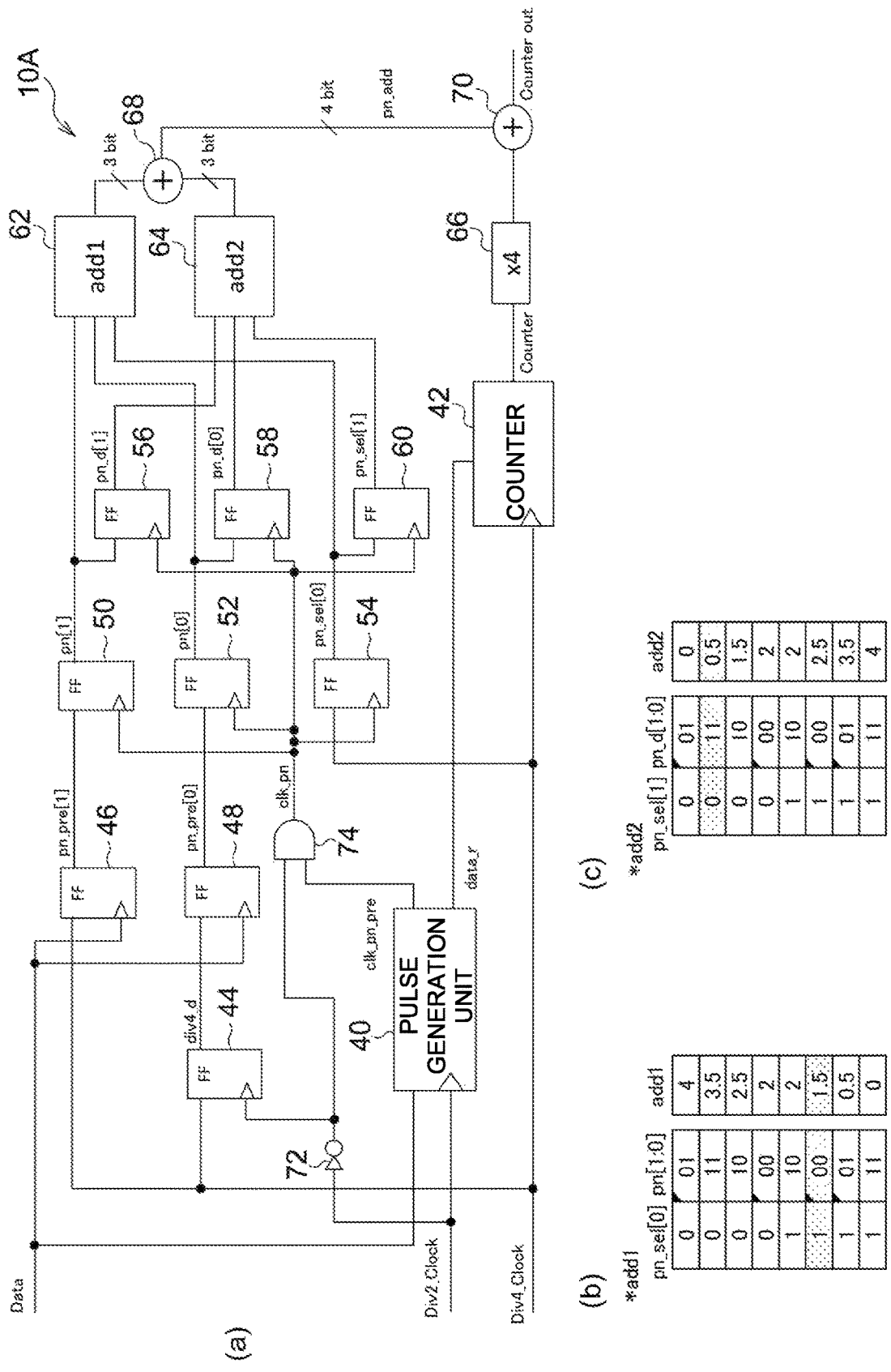
FIG. 4 illustrates (a) a circuit diagram of an example of a configuration of a period detection circuit, (b) a decoding rule of the decoder 62, and (c) a decoding rule of the decoder 64 according to a second embodiment.

A period detection circuit 10A according to a second embodiment will be described with reference to FIGS. 4 and 5. In this embodiment, a Div4_Clock signal obtained by dividing a Clock signal which is a reference clock signal by 4 is further introduced to the period detection circuit 10 according to the first embodiment, thereby achieving a further reduction in consumption current while further improving the accuracy. An Enable_O signal and an Expect signal illustrated in FIG. 5 are signals that are not directly related to the circuit in FIG. 4(a), the Enable_O signal indicates an Enable signal generated using the Clock signal, and the Expect signal indicates a count value of the Clock signal in one period of Data signal.

As illustrated in FIG. 4(a), the period detection circuit 10A includes a pulse generation unit 40, a counter 42, flip-flops 44, 46, 48, 50, 52, 54, 56, 58 and 60, a decoder 62 (add 1), a decoder 64 (add 2), a 4-multiplication unit 66, addition units 68 and 70, an inverter 72, and an AND circuit 74. The period detection circuit 10A counts one period of the Data signal using the Div4_Clock signal. In this case, fractions F1 and F2 are calculated and added to a count value of the counter 42 according to (Equation 1).

Figure 5:
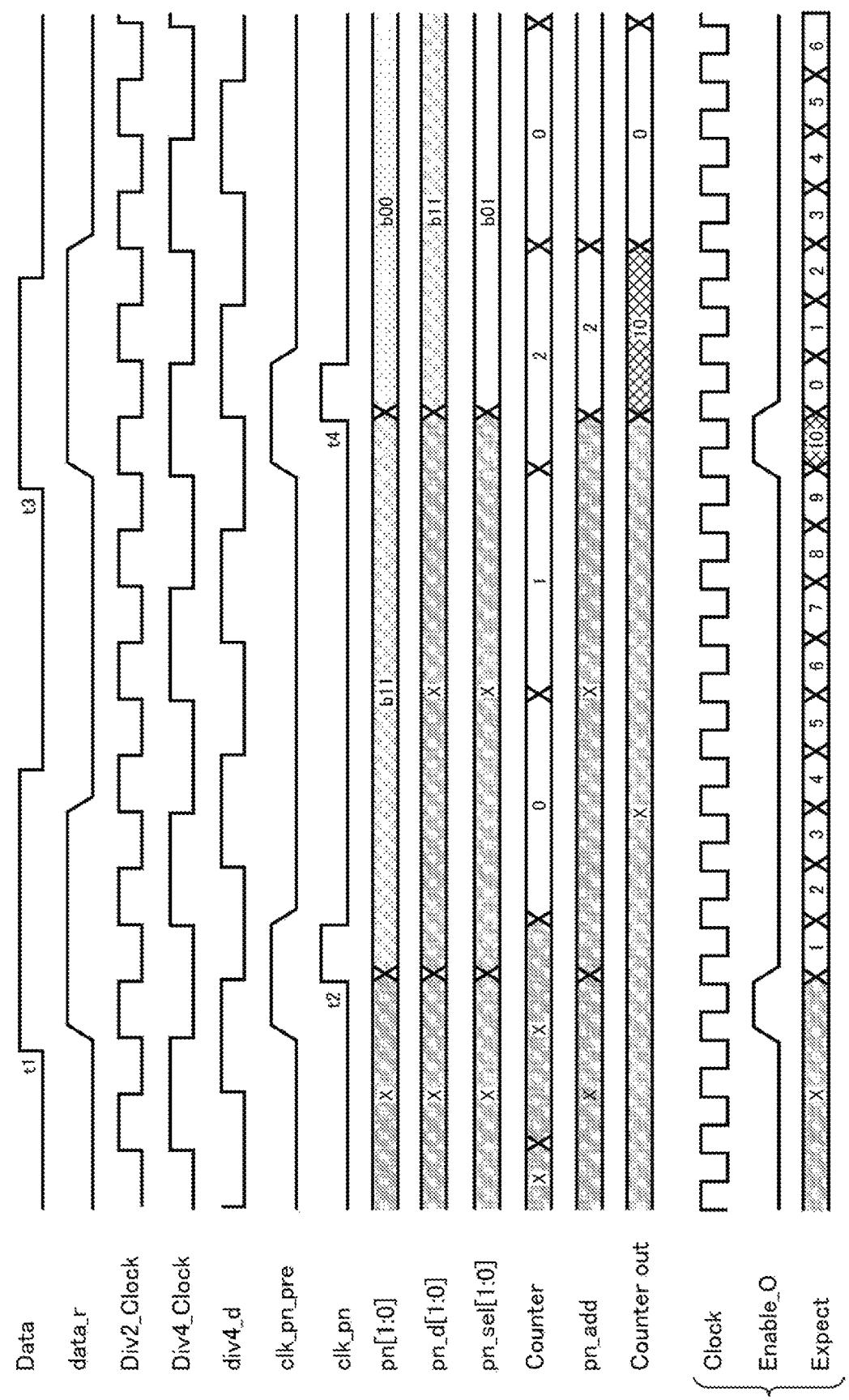
FIG. 5 is a timing chart illustrating an operation of the period detection circuit according to the second embodiment.
Figure 6:
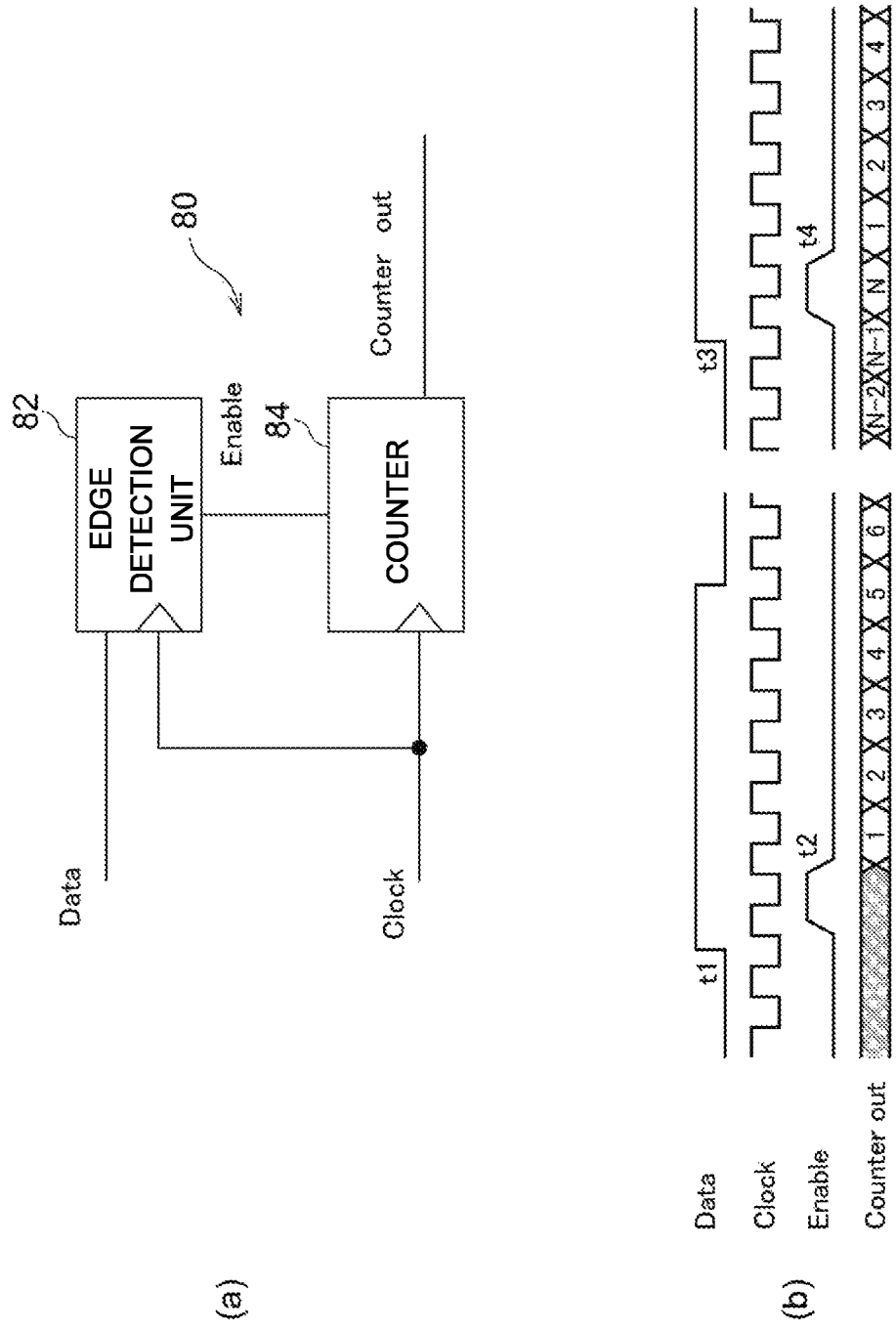
FIG. 6 illustrates (a) a block diagram of a period detection circuit and (b) a timing chart illustrating an operation according to the related art.

As illustrated in FIGS. 4(a) and 5, the pulse generation unit 40 generates a clk_pn_pre signal and a data_r signal from the Data signal with reference to the Div2_Clock signal. The data_r signal is input to the counter 42 together with the Div4_Clock signal, and the number of Div4_Clock signals corresponding to one period of the Data signal is counted. The Div4_Clock is identified by the flip-flop 44 at a timing of the Div2_Clock signal inverted by the inverter 72, and becomes a div4_d signal (a delayed 4-divided clock signal) which is obtained by delaying a phase of the Div4_Clock signal by a ¼ period.

The Div4_Clock signal is identified at a timing of the Data signal by the flip-flop 46, and a pn_pre[1] signal is generated. The div4_d signal is identified at a timing of the Data signal by the flip-flop 48, and a pn_pre[0] signal is generated. On the other hand, the clk_pn_pre signal is extracted by the Div2_Clock in the AND circuit 74, and a clk_pn signal is generated.

The pn_pre[1] signal is identified at the timing of the clk_pn signal by the flip-flop 50, and a pn[1] signal is generated. The pn_pre[0] signal is identified at a timing of the clk_pn signal by the flip-flop 52, and a pn[0] signal is generated. On the other hand, the Div4_Clock signal is identified at the timing of the clk_pn signal by the flip-flop 54, and a pn_sel[0] signal is generated.

The pn[1] signal, the pn[0] signal (both of which may be collectively described as pn[1:0]), and the pn_sel[0] signal are input to the decoder 62. The pn[1:0] signal and the pn_sel[0] signal are signals (a combination of second values) for calculating the fraction F2 at a timing of the second rising edge of the Data signal. That is, the fraction F2 changes according to a phase difference relationship between the signals, and the signals are decoded by the decoder 62 to generate the fraction F2. FIG. 4(b) illustrates a decoding rule of the decoder 62. As illustrated in FIG. 4(b), since the output of the decoder 62 can have 0.5 increments from 0 to 4, the output of the decoder 62 is 3 bits.

Further, the pn[1] signal is identified at a timing of the clk_pn signal by the flip-flop 56 and the pn_d[1] signal is generated. The pn[0] signal is identified at the timing of the clk_pn signal by the flip-flop 58, and the pn_d[0] signal is generated. The pn_sel[0] signal is identified at the timing of clk_pn signal by the flip-flop 60, and the pn_sel[1] signal is generated. Hereinafter, the pn_d[1] signal and the pn_d[0] signal may be collectively referred to as a pn_d[1:0] signal, and the pn_sel[0] signal and the pn_sel[1] signal may be collectively referred to as a pn_sel[1:0] signal (selection signal). The pn_d[1:0] signal and the pn_sel[1] signal are obtained by shifting the pn[1:0] signal and the pn_sel[0] signal, respectively. In other words, a shift register is constituted by a set of the flip-flops 50, 52, and 54 and a set of the flip-flops 56, 58, and 60.

The pn_d[1:0] signal and the pn_sel[1] signal are signals (a combination of first values) for calculating the fraction F1 at a timing of the first rising edge of the Data signal. That is, the fraction F1 is changed according to the phase difference relationship between these signals, and the signals are decoded by the decoder 64 to generate the fraction F1. FIG. 4(c) illustrates a decoding rule of the decoder 64. As illustrated in FIG. 4(c), since an output of the decoder 64 can have 0.5 increments from 0 to 4, the output of the decoder 64 is 3 bits.

As illustrated in FIG. 5, in this example, the Data signal rises at time t1. In synchronization with the rising edge of the Data signal, a elk pn pulse is generated at time t2, and a pn[1:0] signal is generated. In this example, an example in which pn[1:0]=b11 (binary 11) is shown. When the Data signal rises again at time t3, the clk_pn pulse is generated at time t4, a value of pn[1:0] is shifted to pn_d[1:0], and a value of pn[1:0] newly becomes b00.

In this case, in this example, since the value of pn_sel[1:0] is pn_sel[1:0]=b01, a row of pn_sel[0]=1 and pn[1:0]=00 in FIG. 4(b) is referenced, and a decode value of the decoder 62 becomes add1=1.5, that is, F2=1.5. Meanwhile, a row of pn_sel[1]=0 and pn_d[1:0]=11 in FIG. 4(c) is referenced, and the decoded value of the decoder 64 becomes add2=0.5, that is, F1=0.5.

A decoded value of the decoder 62 and a decoded value of the decoder 64 are added by the adder 68 to become a pn_add signal, and in this example, the value of the pn_add signal is 2(=F1+F2=0.5+1.5), as illustrated in FIG. 5.

Meanwhile, the number of net Div4_Clock signals (Nn in (Equation 1)) from the rising edge of the Data signal to the next rising edge is counted by the counter 42, and a Counter signal illustrated in FIG. 5 is generated. In this example, it is counted as 0, 1, or 2, and up to 2, that is, Nn in (Equation 1) is Nn=2. The Counter signal is converted to a quadruple value by the 4-multiplication unit 66, and this value is then added to the pn_add signal by the addition unit 70 to generate a Counter out signal. In this example, the value of Counter out is 10(=2×4+2). This value matches a count value 10 using the Expect signal obtained by counting one period of the Data signal with the Clock signal which is the reference clock signal, as illustrated in FIG. 5.

As described in detail above, according to the period detection circuit 10A of the embodiment, since the period detection circuit of a new scheme is configured using the Div4_Clock signal which is a clock signal at a ¼ frequency of the Clock signal serving as a reference, it is possible to more efficiently reduce the current consumption of the tag. In this case, the accuracy of the counter is the same as that of the period detection circuit 80 according to the related art as described above. According to a comparison through simulation, the period detection circuit 10A has an effect of reducing the current consumption by 50% as compared with the period detection circuit 80.

What is claimed is:

1. A semiconductor device comprising:
an edge detector that detects edges of one of rises and falls of a data signal received via radio waves;
a counter that counts a number of N-divided clock signals having a frequency which is 1/N of a frequency of a reference clock signal having a predetermined frequency according to the data signal in a section of the adjacent edges, wherein N is an integer equal to or greater than 2;
a fraction counter that counts fractions of the N-divided clock signals determined according to a phase difference between the edge and the N-divided clock signal; and
a first adder that adds a value obtained by multiplying a count value of the counter by N to the fractions, and outputs a resultant value as a period of the data signal,
wherein the fraction counter comprises a second adder that adds a first fraction determined according to a phase difference between a first edge of the adjacent edges and the N-divided clock signal to a second fraction determined according to a phase difference between a next edge of the adjacent edges and the N-divided clock signal.

2. The semiconductor device according to claim 1, wherein the fraction counter comprises a shift register that sequentially holds a signal indicating the first fraction and a signal indicating the second fraction.

3. The semiconductor device according to claim 2, wherein a value of N is 4, and
the semiconductor device further comprises:
a first generator that generates a delayed 4-divided clock signal obtained by delaying a phase of the 4-divided clock signal by a ¼ period; and a second generator that generates a selection signal from the 4-divided clock signal in synchronization with a timing of the edges, the shift register outputs a combination of first values indicating a phase relationship with the data signal at the timing of the first edge of each of the 4-divided clock signal, the delayed 4-divided clock signal, and the selection signal, and a combination of second values indicating a phase relationship with the data signal at a timing of the next edge of each of the 4-divided clock signal, the delayed 4-divided clock signal, and the selection signal, and the fraction counter includes a first decoding unit that decodes the combination of the first values to calculate the first fraction, and a second decoding unit that decodes the combination of the second values to calculate the second fraction.

4. The semiconductor device according to claim 1, wherein a value of N is 2, and the second adder inverts the second fraction, adds 1 to the inverted second fraction, and adds a resultant fraction to the first fraction.

5. The semiconductor device according to claim 1, wherein the semiconductor device further comprises:

a demodulator that demodulates the data signal using a period of the data signal detected by the semiconductor device; and a clock signal generator that generates the reference clock signal according to a power generated from the radio waves.

6. A non-contact electronic device comprising:

the semiconductor device according to claim 1; and an antenna that receives the radio waves including the data signal.

7. A period detection method comprising:

detecting, by an edge detector, edges of one of rises and falls of a data signal received via radio waves;

counting, by a counter, a number of N-divided clock signals having a frequency which is 1/N of a frequency of a reference clock signal having a predetermined frequency according to the data signal in a section of the adjacent edges, wherein N is an integer equal to or greater than 2;

counting, by a fraction counter, fractions of the N-divided clock signals determined according to a phase difference between the edge and the N-divided clock signal;

adding, by a first adder, a value obtained by multiplying a count value of the counter by N to the fractions to detect a period of the data signal; and adding, by a second adder of the fraction counter, a first fraction determined according to a phase difference between a first edge of the adjacent edges and the N-divided clock signal to a second fraction determined according to a phase difference between a next edge of the adjacent edges and the N-divided clock signal.

* * * * *